INVENTORS
RICHARD H. CARLSON
& EDWARD M. FELKEL

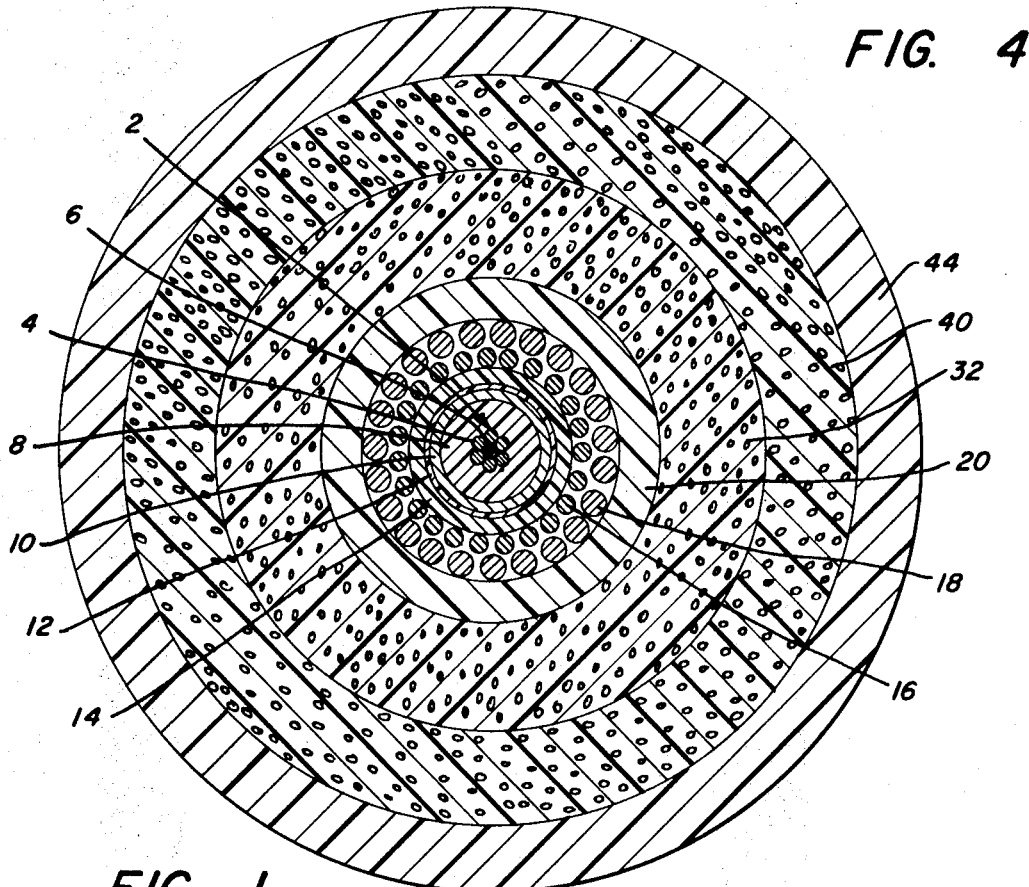
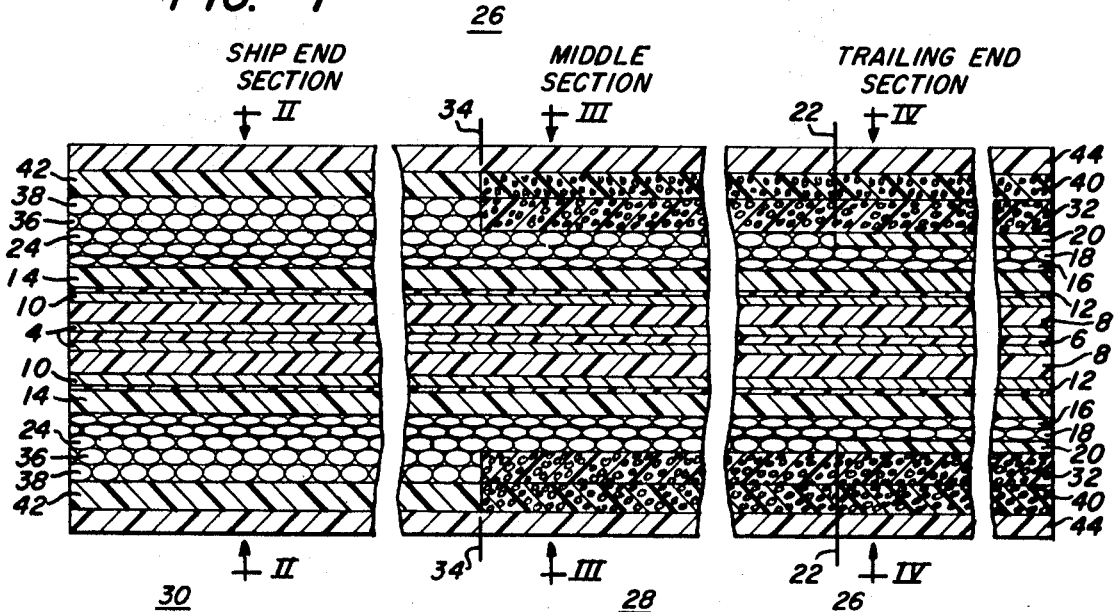

By *Rea C. Helm*

Attorney

INVENTORS
RICHARD H. CARLSON
& EDWARD M. FELKEL

By Rea C. Helm

Attorney

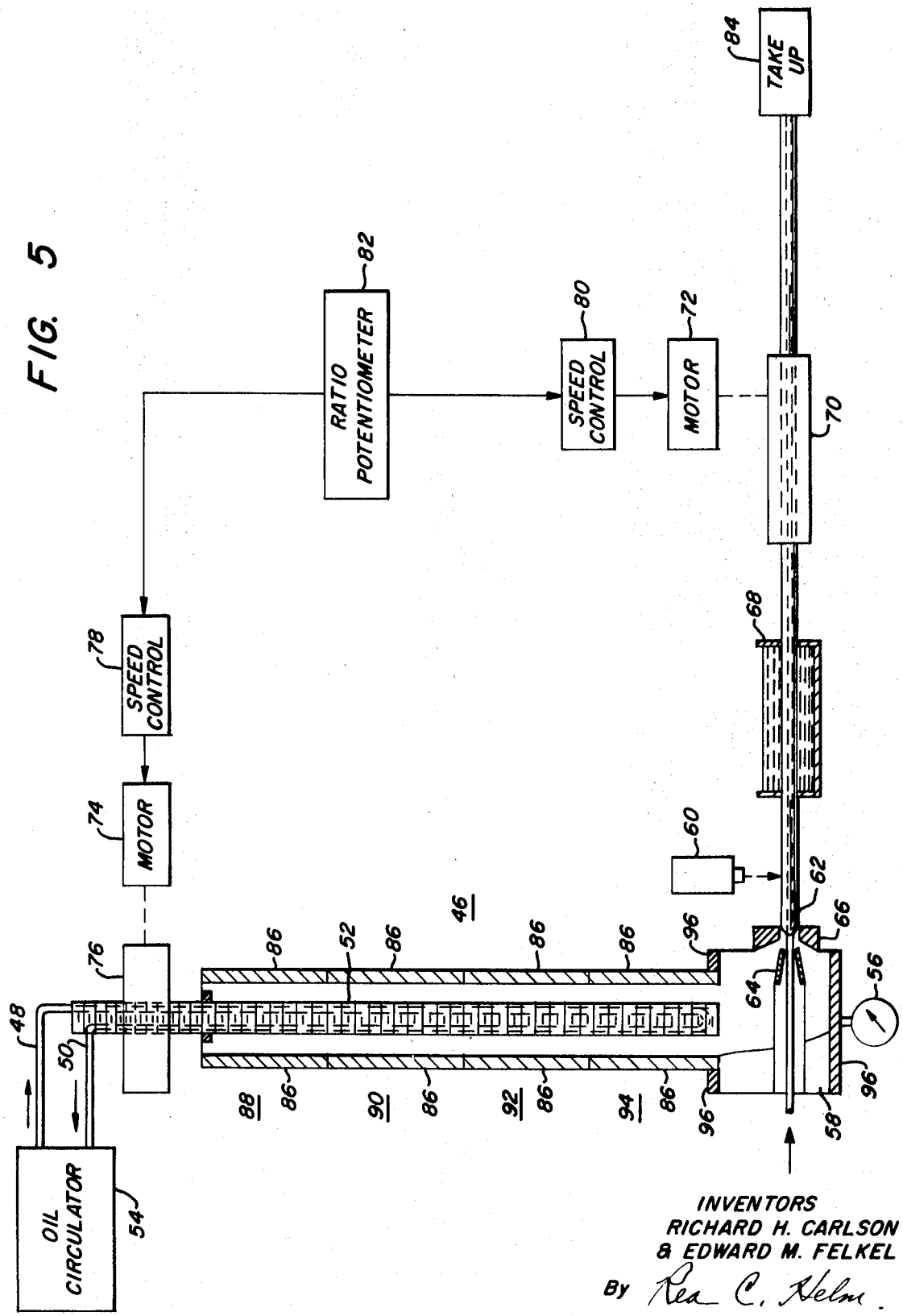

United States Patent Office 3,605,398
Patented Sept. 20, 1971

3,605,398
VARIABLE WEIGHT CABLE
Richard H. Carlson, North Grafton, and Edward M. Felkel, Worcester, Mass., assignors to United States Steel Corporation
Filed Mar. 23, 1970, Ser. No. 21,614
Int. Cl. D07b 1/16
U.S. Cl. 57—149          7 Claims

ABSTRACT OF THE DISCLOSURE

A splice free tow cable, built up of layers of armor wire and plastics of different densities surrounding a conductor core, has variable weight and strength sections.

---

This invention relates to an electrical cable and more particularly, to a continuous length tow cable which has a uniform diameter and sections of different strength and weight in sea water.

In oceanographic research, off-shore oil-well exploration, and sonar operations, sensors or other detection devices are used for locating undersea objects and phenomena. Sensors are positioned at a known distance from a ship and at a known distance below the ocean surface. Since the sensor must be maintained in fixed relationship to the ship, special towing cables of controlled weight and strength are required.

These cables require high strength and weight near the ship, but the trailing end of the cable has better hydrodynamic characteristics if it has little weight in sea water. Such cables have been produced by splicing two separate sections, a ship-end section that is heavy and strong and a trailing end section of considerably less strength and weight. This splice has been the cause of poor cable performance because of mechanical difficulties caused by the sudden change in cable weight and because of electrical difficulties caused by the ingress of moisture at the splice. In addition, the trailing end of the cable tends to pivot around the splice area resulting in fatigue and poor hydrodynamic characteristics.

It is therefore an object of our invention to provide a layered continuous length cable which eliminates the need for cable splices.

Another object is to provide a layered continuous length cable having sections of progressively varying weight and a constant outer diameter.

These and other objects will be more apparent after referring to the following drawings and specification in which:

FIG. 1 is a fragmented longitudinal section of a preferred embodiment of our variable weight cable.

FIG. 4 is a cross-sectional area of the trailing end along line IV—IV of FIG. 1; and FIG. 5 is a schematic arrangement of apparatus for practicing the method of extrusion of our invention.

Figure 2:
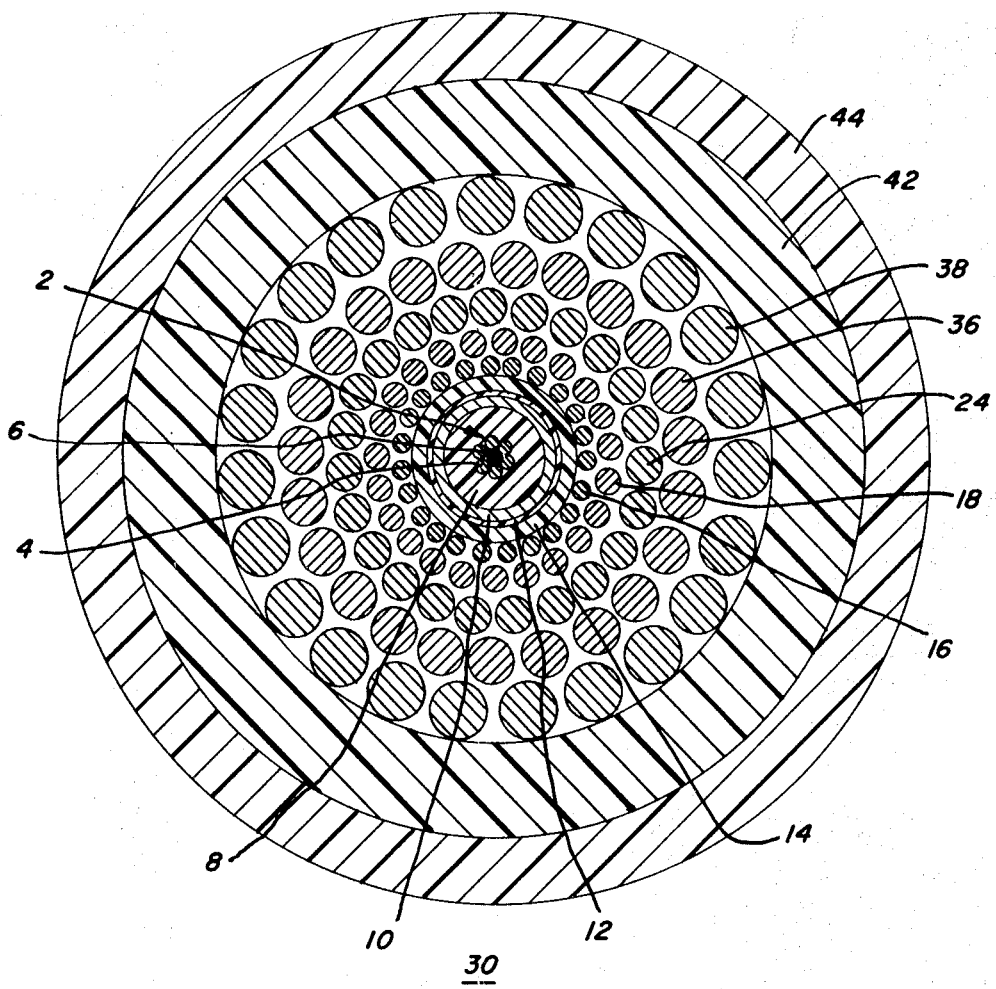
FIG. 2 is a cross-sectional area of the ship-end section of the cable along line II—II of FIG. 1.

Referring now to the drawings, reference numeral 2 indicates a central conductor of six copper wires 4, surrounding a nylon monofilament core 6. Surrounding conductor 2 is a crystalline ethylene-propylene copolymer insulation 8. A copper wire braid 10 is applied over insulation 8 as an outer conductor. A polyester film tape 12 is applied over braid 10 and a crystalline ethylene-propylene copolymer jacket 14 is applied over the tape 12. While a conventional coaxial cable has thus far been described as the central core member throughout the entire length of our variable weight cable, other electrical constructions may be used depending on the requirements of each particular use.

Two layers, 16 and 18, of helically wrapped galvanized steel armor wire are placed over the jacket 14 throughout the length of the cable. These layers of armor wire provide the necessary strength for the cable. Each layer contains twenty-four wires of an appropriate diameter to cover from about 93% to about 98% of the circumference of the central core. The layers are preferably wrapped in opposite directions.

Figure 3:
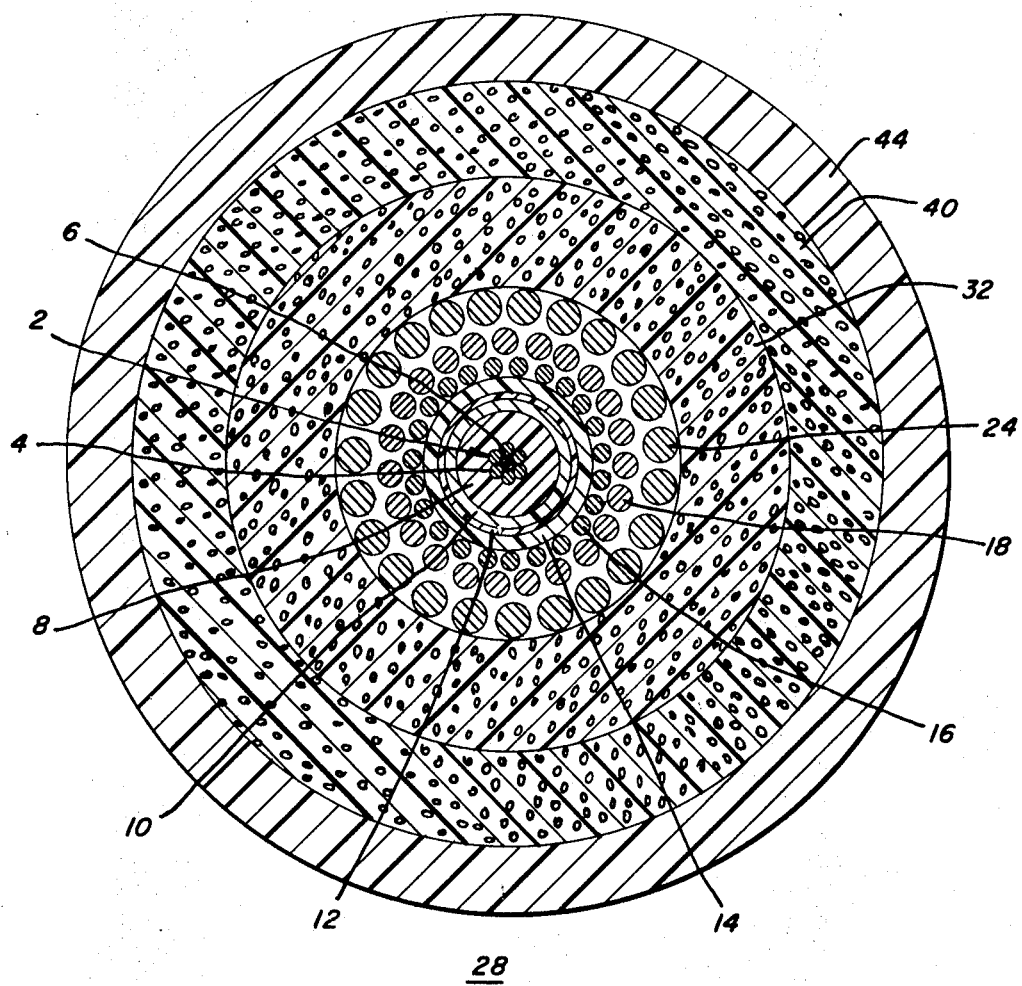
FIG. 3 is a cross-sectional area of the mid-section along line III—III of FIG. 1.

A solid polyethylene jacket 20, FIG. 4, is extruded over layer 18 beginning from the trailing end of the cable to a first location 22, FIG. 1, where it is desired to change the weight and strength of the cable. A third layer 24, of twenty-four galvanized steel armor wires covering from about 93% to about 98% of the circumference, is helically wrapped over layer 18 as shown in FIGS. 2 and 3 for the length of the cable at the ship-end section and mid-section to location 22. Layer 24 is preferably wrapped in the opposite direction of layer 18, and is the same thickness as layer 20. This provides a relatively uniform diameter layer throughout the length of the cable, the armor wires 24 shown in FIGS. 2 and 3 and a solid polyethylene jacket 20 shown in FIG. 4. The trailing end 26, FIG. 4, is lighter, but not as strong as, mid-section 28, FIG. 3, and ship-end 30, FIG. 2.

A cellular polyethylene jacket 32 is extruded over jacket 20 and armor wire layer 24 beginning from the trailing end of the cable to a second location 34 where it is again desired to change the weight and strength of the cable. A fourth layer of galvanized steel armor wire 36, and a fifth layer of galvanized armor wire 38, FIG. 2, are helically wrapped over armor wire layer 24 beginning from location 34 to the ship-end of the cable. Layers 36 and 38 are each twenty-four wires covering from about 93% to about 98% of the circumference of the cable and together are the same thickness as jacket 32. Layer 36 is wrapped in the opposite direction of layer 38, and layer 36 is wrapped in the same direction of layer 24 to balance the torque created by the helically wrapped armor wire layers 16, 18, 24, 36 and 38. This provides an additional relatively uniform diameter layer throughout the length of the cable, a cellular polyethylene jacket 32 shown in FIGS. 3 and 4, and armor wire layers 36 and 38 shown in FIG. 2. In this layer, the trailing end 26 and the mid-section 28 are lighter, but not as strong as ship-end section 30.

A cellular polyethylene jacket 40 is extruded over cellular jacket 32 in the trailing end 26, FIG. 4, and mid-section 28, FIG. 3, to location 34 where a gradual change is made to a solid polyethylene jacket 42 of the same diameter for the balance of the cable, ship-end section 30, FIG. 2. This provides a third relatively uniform diameter layer throughout the length of the cable, a cellular polyethylene jacket 40 in the trailing end 26 and mid-section 28 which is lighter than the solid jacket 42 in the ship-end section 30. A solid polyethylene outer jacket 44 is extruded over jackets 40 and 42 throughout the length of the cable.

While armor wire layers 16, 18, 24, 36 and 38 are described as helically wrapped, braided armor wire may be used for one or more layers.

Building up the cable with uniform thickness concentric layers provides a cable free of splices and abrupt weight or strength changes which tend to weaken tow cables. The cable has a uniform diameter and is flexible enough throughout its length to be reeled and unreeled over relatively small curvatures without weakening the cable. The length and thickness of solid polyethylene, foamed polyethylene and armor wire in the sections may be varied to provide any desired combination of weight and strength.

While the solid jackets and the armor wires are placed on the cable by conventional methods, the cellular jackets require particular methods of extrusion.

In order that cellular jackets 32 and 40 will meet requirements of specific gravity, a smooth surface, a closed-cell structure and low water absorption at high pressures, they should be made of a foamable, low density polyethylene. The material used should have a high melt strength at the temperature of decomposition of the blowing agent. If melt strength is too low, the gas liberated by the blowing agent encounters little resistance to expansion and the result is a large open-cell structure with a rough surface. A highly branched, high molecular weight polyethylene provides a rubber-like consistency to the melt. This allows more latitude in processing temperatures because the melt viscosity does not decrease rapidly with increased temperatures. In addition, the extrusion must be made under carefully controlled conditions as hereinafter described.

Referring now to FIG. 5, extruder 46 is a conventional extruder used for extruding the cellular and solid jackets. Oil is circulated through lines 48 and 50 through screw 52 at a predetermined temperature by a circulating heating unit 54, such as a Sterlco Model 6016 unit manufactured by Sterling Inc., of Milwaukee, Wis. A pressure gage 56 measures the pressure of the melt in the crosshead 58. A noncontact, infrared radiation thermometer 60, such as Model 300T1 Ircon radiation thermometer manufactured by Ircon Inc., of Chicago, Ill., is focused on the extrudate 62 just as it leaves dies 64 and 66 in crosshead 58. This method of temperature measurement avoids potential errors of measuring the temperature of a heated crosshead instead of the extrudate which is often the case in a crosshead thermocouple. A water cooling trough 68 is located just beyond the crosshead 58, preferably no more than about four feet. A capstan 70 is located just beyond the cooling trough 68 and is driven by variable speed motor 72. Another variable speed motor 74 drives screw 52 through a gear reducer and transmission 76. Motors 72 and 74 are connected to a power source (not shown) with speed controls 78 and 80 respectively and a ratio potentiometer 82 to change the ratio of the speed motors 72 and 74. The finished cable is reeled on a conventional take-up 84. Electrical resistance heaters 86 surround screw 52 in four separately controlled heating zones 88, 90, 92 and 94. Electrical resistance heater 96 surrounds crosshead 58.

In extruding the cellular section of our variable weight cable, short-land, pressure-type dies 64 and 68 are preferred. Die sizes are selected by conventional methods, depending on the desired dimensions of the finished cable, the core diameter and the desired gas content. For example, cellular layers 32 and 40 have a 40% gas content which, when combined with the other cable elements, make a trailing end 26 nearly buoyant in sea water. Die spacing is set for a melt pressure between 300 and 1000 p.s.i.g. Insufficient head pressure allows blowing to occur inside the crosshead resulting in an open-cell structure with a rough surface, seriously diminishing a desired high hydrostatic pressure capability. Too high a head pressure restricts output and results in excessive expansion in the extrudate. Temperature settings for a 40% gas content extrudate should be about 150° F. for the screw circulating oil, 40° F. to 50° F. for quench water, 290° F. for zones 88, 90 and 92, 300° F. to 330° F. for zone 94, 270° F. to 290° F. for crosshead 58 and 270° F. for dies 64 and 66. The extrudate temperature as read by thermometer 60 should be 325° F. to 330° F.

In order to maintain both the desired extrudate temperature and the desired diameter, ratio potentiometer 82 is used to control the ratio of the speed of the screw 52 and the speed of the capstan 70. Screw speed is used for fine temperature control along with the ratio control.

The rate of cooling of the extrudate will also affect the specific gravity of the extrudate. The rate of cooling is set by the distance between the crosshead 58 and the cooling water trough 68, the water temperature and the line speed. When layer 32 is extruded, the difference in thermal capacity of armor layer 24 over plastic layer 20 requires a slightly higher extrudate temperature. Temperature changes at location 22 are accomplished by feed screw speed changes.

In extruding the layer including jackets 40 and 42, it is preferred to start with the cellular section 40. About 150 feet before location 34 is reached, extrusion speed and temperature are reduced and the feed changed to a solid, low density polyethylene compatible with the foamable, low density polyethylene. Since reducing the temperature tends to reduce the diameter, the speed ratio is constantly adjusted so that diameter will remain constant during the transition. The diameter stabilizes when all the foamable material has been displaced and at this time the temperature profile of the crosshead is raised to that normally required for a solid, low density polyethylene jacket extrusion.

We claim:

1. A variable weight and strength cable comprising a generally round core member extending the length of the cable, and a concentric layer surrounding the core member having a generally uniform thickness throughout the cable length, said layer having two longitudinal sections of different weights with one of said sections being of the group consisting of metallic armor wires and a first plastic having a first density and the other of said sections being of the group consisting of said first plastic and a second plastic having a second density.

2. A cable according to claim 1 in which said metallic armor wires are helically wrapped galvanized steel and said plastics are solid polyethylene and cellular polyethylene.

3. A cable according to claim 1 in which said metallic armor wires are applied as a braid and said plastics are solid polyethylene and cellular polyethylene.

4. A cable according to claim 1 which includes another concentric layer of generally uniform thickness throughout the cable length, said layer being of the group consisting of metallic armor wires, a third plastic having a third density and a fourth plastic having a density different than the third density.

5. A cable according to claim 4 in which said armor wires are helically wrapped galvanized steel and all of said plastics are of the group consisting of solid polyethylene and cellular polyethylene.

6. A cable according to claim 5 in which said core member includes a central electrical conductor, a layer of insulation surrounding the central conductor, a concentric outer conductor surrounding the layer of insulation, a layer of insulating tape surrounding the concentric outer conductor, and a plastic protective jacket surrounding the layer of insulating tape.

7. A cable according to claim 5 in which said cellular polyethylene is a polyethylene mixed with a gas released by a blowing agent when said polyethylene is extruded and said polyethylene has a high melt strength at the temperature of decomposition of said blowing agent thereby providing a closed cellular structure.

References Cited

UNITED STATES PATENTS

| | | | |
|---|---|---|---|
| 2,181,475 | 11/1939 | Bourbon | 57—149X |
| 2,725,713 | 12/1955 | Blanchard | 57—149 |
| 3,534,542 | 10/1970 | West | 57—149X |
| 3,507,741 | 4/1970 | Aleixo | 57—153X |

DONALD E. WATKINS, Primary Examiner